United States Patent [19]

Lindstrom

[11] 4,340,013
[45] Jul. 20, 1982

[54] MEANS AND PROCEDURE FOR THE OPERATION OF COMBUSTION ENGINE

[76] Inventor: Olle B. Lindstrom, Lorensviksv 14, S-18363 Täby, Sweden

[21] Appl. No.: 184,884

[22] Filed: Sep. 8, 1980

Related U.S. Application Data

[62] Division of Ser. No. 885,324, Mar. 10, 1978, Pat. No. 4,244,328.

[30] Foreign Application Priority Data

Mar. 17, 1977 [SE] Sweden ................... 7703011

[51] Int. Cl.³ .............................................. F02B 43/08
[52] U.S. Cl. ..................................... 123/3; 123/1 A; 123/568
[58] Field of Search .................. 123/1 A, 3, 25 R, 568

[56] References Cited

U.S. PATENT DOCUMENTS

| 3,717,129 | 2/1973 | Fox ....................................... 123/1 A |
| 3,817,221 | 6/1974 | Nohira et al. ...................... 123/25 R |
| 3,963,000 | 6/1976 | Kosaka et al. ........................... 123/3 |
| 4,003,343 | 1/1977 | Lee ..................................... 123/1 A |
| 4,041,910 | 8/1977 | Houseman .............................. 123/3 |
| 4,086,877 | 5/1978 | Henkel et al. ............................. 123/3 |
| 4,088,450 | 5/1978 | Kosaka et al. ........................... 123/3 |
| 4,143,620 | 3/1979 | Noguchi et al. ......................... 123/3 |
| 4,210,103 | 7/1980 | Dimitroff et al. ....................... 123/3 |

Primary Examiner—Craig R. Feinberg
Attorney, Agent, or Firm—Burns, Doane, Swecker & Mathis

[57] ABSTRACT

An improved process and apparatus for preparing a gaseous mixture of hydrocarbon and carbon monoxide to be supplied to the air/fuel mixture of a combustion engine is disclosed. The process and apparatus are useful in reducing the amount of noxious components and aldehydes in the engine exhaust gas. In one embodiment of the invention, an improved process and combustion engine are provided for reducing the noxious components and aldehydes. Recycled, water vapor-containing exhaust gas is mixed with at least one lower alcohol. Subsequently, the lower alcohol is catalytically steam reformed in the presence of the exhaust gas to form a gaseous mixture of hydrogen and carbon monoxide, at least a portion of the water vapor and energy required for the steam reforming being provided by the exhaust gas. The hydrogen/carbon monoxide mixture is combined with a mixture of air and a disparate primary engine fuel, and the combined mixture is supplied to a combustion zone wherein the mixture is combusted to produce an exhaust gas having a reduced amount of noxious components and aldehydes. Preferably, the lower alcohol is methanol, the primary fuel is gasoline, and the steam reforming is carried out in the presence of a noble metal catalyst or a nickel catalyst.

6 Claims, 1 Drawing Figure

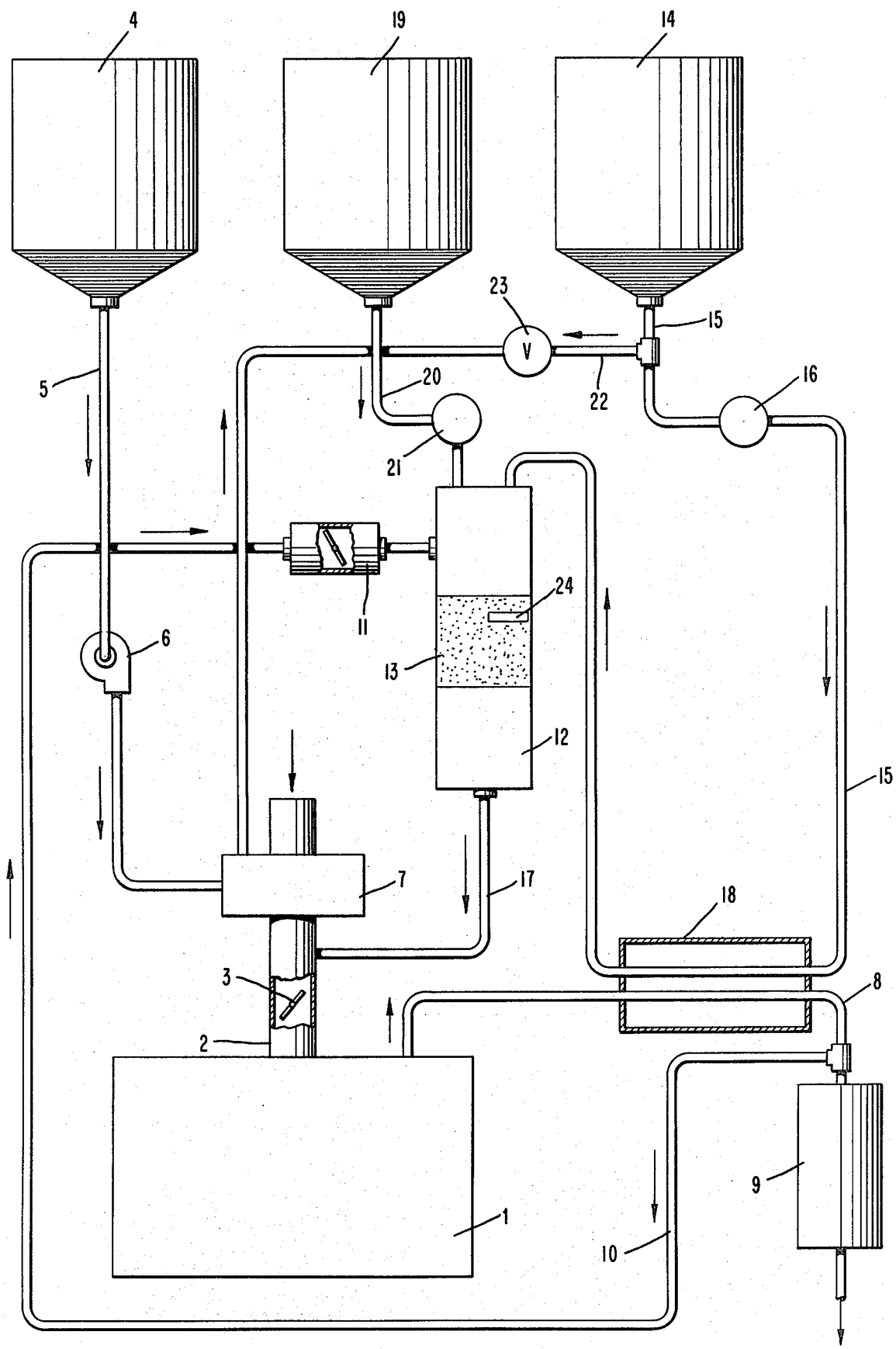

MEANS AND PROCEDURE FOR THE OPERATION OF COMBUSTION ENGINE

This is a division, of application Ser. No. 885,324, filed Mar. 10, 1978, now U.S. Pat. No. 4,244,328.

In the past years methanol has received attention as an additive to gasoline. Methanol has a high octane number and it is therefore possible to replace the lead additive in gasoline with an additive having up to 20% methanol. In this way, the lead emissions in the exhaust gas are eliminated. Also, there will be a lower content of nitrogen oxides, carbon monoxides and unburnt hydrocarbons in the exhaust gas.

Another approach to improving the exhaust gas quality is to add hydrogen to the combustion engine. Hydrogen addition makes it possible to operate at a higher air to fuel ratio resulting in a lower content of unburnt hydrocarbons and carbon monoxide. A particularly advantageous procedure to supply hydrogen is described in my earlier U.S. Pat. No. 3,918,412. According to that patent, hydrogen is produced by steam reforming of a part of the fuel in a catalytic reactor by reaction with steam and carbon dioxide. A portion of the exhaust gas is recirculated to the catalytic reactor where it is mixed with part of the liquid fuel which then is converted to hydrogen and carbon monoxide. This procedure gives improved fuel economy and good control of unburnt hydrocarbons and carbon monoxide as well as of nitrogen oxides. It is also disclosed in my earlier patent that lower alcohols can be used as fuel. Part of the alcohol fuel is supplied directly to the combustion engine and part of it to the catalytic reactor for steam reforming to hydrogen and carbon monoxide.

A serious drawback with the alcohol fuels is their low energy content. One liter of gasoline is equivalent to two liters of methanol which means that a methanol fuel car must carry twice as much fuel tanks as a corresponding gasoline car.

The method as discussed above comprising supplying a small quantity of methanol to gasoline may therefore be considered as a good compromise which meets the requirement for high energy constant of the fuel as well as the requirements for good environmental qualities. The advantages and drawbacks of methanol addition to gasoline for cars are presently being evaluated. The present state of the art is reported in the proceedings from the seminar "Methanol as a Fuel", conducted in Stockholm Mar. 21, 22 and 24, 1976. In these proceedings, the environmental advantages of such processes were elucidated. Also, a number of practical problems which must be solved in changing to a methanol additive in gasoline were discussed.

Several different problems exist. One well known problem is the risk of phase separation. This depends partly on the composition of the gasoline and partly on its water content. It is difficult to prevent water vapor from coming into the tank and other spaces carrying fuel. The methanol additive also produces special materials problems. For instance, the additive produces corrosion on light metal components and otherwise affects components made of polymers and rubbers in systems such as the fuel system. By choice of proper materials which are resistant in the particular chemical environment, these material problems may be solved. The advantages with the methanol additives are of course dependent on the chemical composition and reactivity of methanol. The most difficult motor problems also depend on the inherent properties of the methanol. The high vapor pressure of methanol thus gives differences in the methanol-gasoline distribution between the different cylinders in the engine. The high heat of evaporation of methanol produces cooling of the components where methanol is being vaporized. These problems require considerable redesign of the combustion engine, which in turn prevents a fast introduction of the new motor fuel. Increased motor wear has also been observed and it appears that some lead should be added to the gasoline to overcome this problem.

The methanol additive is not completely free of problems from an environmental point of view in spite of reduced emissions of unburnt hydrocarbons, carbon monoxide and nitrogen oxides. Small quantities of aldehydes are produced in the combustion and the influence of these aldehydes on the environment and public health has not been clarified.

Pure hydrogen would of course be an ideal motor fuel from many viewpoints, and is the subject of considerable interest. The prime difficulty is, however, the storage. The hydrogen would occupy a volume which is at least as large as the volume of, for example, methanol with the same energy content. To convert a more energy-rich fuel like gasoline to 100% hydrogen requires a process system of a considerable size. The ideal would of course be if motor fuel could be supplied with a hydrogen additive instead of the methanol additive being discussed above. This would provide a compromise meeting all the conflicting requirements which are put on motor fuel as discussed above. It is not, however, possible to bind hydrogen in gasoline.

The drawback associated with my earlier U.S. patent referred to above when used with gasoline is the comparatively high temperature needed for steam reforming. This, among other things, has the effect of producing a low energy recovery from the exhaust gas steam. Application of the invention disclosed in my earlier patent to alcohol fuels, on the other hand, requires comparatively large volumes for, e.g., the fuel tanks.

While this invention is related to the method of supplying methanol to gasoline and the method of supplying hydrogen to the fuel-air mixture according to my earlier U.S. Pat. No. 3,918,412, it eliminates the problems which are connected with methanol addition to gasoline as described above as well as other problems which are associated with the procedure according to U.S. Pat. No. 3,918,412.

In the description which follows, it is noted that the present invention uses the same primary fuels as are normally used in methanol addition to gasoline.

One object of the present invention is to eliminate the risk for phase separation in methanol-gasoline mixtures.

A second object is to reduce corrosion and material changes in the fuel system of the engine.

A third object is to eliminate the uneven distribution of fuel components between the different cylinders of the engine.

A fourth object is to eliminate the risk for vapor lock and freezing of, e.g., the carburetor, caused by the high heat of vaporization of the methanol.

A fifth object is to improve the fuel economy by utilization of part of the energy content of the exhaust gases.

A sixth object is to improve the quality of the exhaust gas associated with the methanol addition to gasoline by eliminating or at least drastically reducing the aldehyde emissions.

A seventh object is to allow freedom in the choice of the composition of the motor fuels.

An eight object of the invention is to make possible a simple rebuilding of existing engines.

A ninth object is to require only simple modification of the distribution system and fuel supply system to convert to the new fuel system.

In one aspect of this invention a process is provided for reducing the amount of noxious components and aldehydes in the exhaust gas of an operating combustion engine. A water vapor-containing exhaust gas stream from the combustion engine is recycled to a first zone wherein the exhaust gas stream is mixed with a separate feed stream comprising at least one lower alcohol. The lower alcohol containing feed stream is catalytically steam reformed in a steam reforming zone in the presence of said exhaust gas stream to form a gaseous mixture comprising hydrogen and carbon monoxide, whereby at least a portion of the water vapor and energy required for said steam reforming is provided by said exhaust gas stream. The gaseous mixture of hydrogen and carbon monoxide is combined with a mixture of air and a disparate primary engine fuel, and the hydrogen/carbon monoxide/air/primary fuel mixture is supplied to a combustion zone within said combustion engine. The mixture is combusted in said combustion zone to produce an exhaust gas comprising a reduced amount of noxious components and aldehydes.

In another aspect of the present invention, an improved combustion engine is provided which emits an exhaust gas containing a reduced amount of noxious components and aldehydes. The combustion engine comprises means operatively connected to a first zone for recycling a water vapor-containing exhaust gas stream thereto. Means are provided for introducing into said first zone a separate feed stream to be mixed with said exhaust gas stream, which separate feed stream comprises at least one lower alcohol. Means are also provided within said first zone for catalytically steam reforming said lower alcohol-containing feed stream in the presence of said exhaust gas stream to form a gaseous mixture comprising hydrogen and carbon monoxide, whereby at least a portion of the water vapor and energy required for said steam reforming is provided by said exhaust gas stream. Adjacent to said first zone, means are disposed for combining said gaseous mixture of hydrogen and carbon monoxide with a mixture of air and disparate primary engine fuel. Operatively connected to said combining means are means for supplying the hydrogen/carbon monoxide/air/primary fuel mixture to a combustion zone within said combustion engine. Finally, means for combusting said mixture in said combustion zone to produce an exhaust gas comprising a reduced amount of noxious components in the aldehydes are provided.

In yet another aspect of the present invention, an improved combustion engine with exhaust gas recirculation is provided. The improvement is as follows: means are provided for mixing a feed stream comprising at least one lower alcohol with a water vapor-containing exhaust gas stream in a first zone. Within said first zone, means are provided for catalytically steam reforming said lower alcohol-containing feed stream in the presence of said exhaust gas stream to form a gaseous mixture comprising hydrogen and carbon monoxide, whereby at least a portion of the water vapor and energy required for said steam reforming is provided by said exhaust gas stream. Disposed adjacent to said first zone are means for combining said gaseous mixture of hydrogen and carbon monoxide with a mixture of air and a disparate primary engine fuel. Operatively connected to said combining means are means for supplying the hydrogen/carbon monoxide/air/primary fuel mixture to a combustion zone within said combustion engine. Finally, means are provided for combusting said mixture in said combustion zone to produce an exhaust gas comprising a reduced amount of noxious components and aldehydes.

All these highly desired advantages and properties are produced by means of the present invention in an extremely simple and surprising way. The essence of the present invention is a combination of several factors. One important factor is that the methanol is never mixed with the gasoline but is distributed separately and contained in a special tank on the vehicle. The second factor is that most of the methanol is changed to hydrogen and carbon monoxide in a special catalytic reactor whereafter the gaseous mixture is supplied to the engine, e.g., by mixing the gasoline-air-fuel mixture in the carburetor. The third factor is that the methanol is converted to hydrogen and carbon monoxide by reaction with water vapor in the recirculated exhaust gas. If the rate of recirculation is to be reduced, it is possible to supply additional water to the methanol. A fourth important factor is that the steam reforming of the methanol may proceed at a comparatively low temperature of about 300° C. This makes possible recovery of an important part of the energy content of the exhaust gas by direct and possibly all indirect contact between the reaction mixture and the exhaust gas stream.

The invention thus consists of a new method to produce a gas mixture containing hydrogen and carbon monoxide to be added to the fuel/air mixture for a combustion engine for the purpose of reducing the content of noxious components in the exhaust gases given off from the combustion engine. The invention is characterized by the hydrogen and the carbon monoxide being produced by steam reforming of methanol in a catalytic reactor, by at least part of the requirement of water vapor for the steam reforming and also the energy for the reaction being satisfied by supplying exhaust gas from the combustion engine to the catalytic reactor where it is mixed with the methanol and by the methanol being supplied from a special methanol system containing a tank, conduits and feeding means for the supplying of methanol to the catalytic reactor.

The invention shall now be described in more detail by means of the accompanying single FIGURE which shows means for carrying out the procedure according to the invention. The engine 1 is supplied by an inlet pipe 2 having a choke 3. The gasoline is supplied from a gasoline tank 4 by means of a conduit 5 containing a fuel pump 6 to a carburetor 7 in a known manner. The exhaust gases leave the engine via the exhaust gas stream for recirculation. The flow is controlled by means of, e.g., a choke 11 to the catalytic reactor 12 which contains a catalyst 13. Methanol is also supplied to the catalytic reactor from a methanol tank 14 by a conduit 15 which contains a feeding means 16. A conduit 17 carries recirculated exhaust gas as well as hydrogen, carbon monoxide a non-reacted methanol to the inlet pipe 2.

It may be of advantage to vaporize the methanol prior to feeding it into the catalytic reactor 12. The FIGURE shows a vaporizer 18 in the conduit 15 which may be employed for this purpose. Heat is supplied to the vaporizer from the exhaust gas flow.

It was mentioned above that it is sometimes of advantage to supply additional water to the catalytic reactor. The FIGURE also shows a water tank 19 which may be used to supply the catalytic reactor 12 with additional water via a conduit 20 with a feeding means 21.

There exist several possibilities to carry out the startup procedure. One possibility is to start up the system on methanol and then convert to two-fuel operation when the catalyst has obtained a temperature of about 300° C. To start on methanol, the FIGURE also shows a separate conduit 22 which may be employed when the system is started up on methanol. The conduit contains a valve 23 controlled by a temperature indicator 24. A similar valve in the gasoline system, which valve is not shown in the FIGURE, prevents supply of gasoline to the engine until the catalytic reactor has attained its temperature of operation, whereafter the direct methanol supply is shut off by means of the valve 23.

Combustion engines with exhaust gas recirculation are available on the market and represent technology known to those skilled in this art. Therefore, no more details are required. A description of this technology is given, e.g., in U.S. Pat. No. 3,294,073.

The methanol system, including the catalytic reactor, is thus an improvement to a known combustion engine with exhaust gas recirculation. Since part of the combustion energy is derived from the methanol, it is necessary to reduce the supply of gasoline to the carburetor correspondingly by adjusting the carburetor. It is frequently useful to work with a volume flow of methanol which is about 5–30% of the volume flow for the gasoline. A particularly advantageous range is 10–20% of the volume flow for the gasoline which is equivalent to 5–10% of the combustion energy derived from the methanol.

Methanol is of course a particularly good fuel for use in the present invention based on its low production costs and the ability to produce methanol from a large number of solid fuels ranging from coal to municipal refuse. The invention is, however, not limited to methanol but may equally well be applied to other lower alcohols, e.g., ethyl alcohol, isopropanol or similar lower alcohols and mixtures thereof. So called methyl fuel may also be used. Methyl fuel is composed mainly of methyl alcohol but also contains a minor part of higher alcohols. The description which follows will use as an exemplary fuel methanol, i.e., technical fuel in which a major part, i.e., about more than 90%, is composed of methyl alcohol. The methanol may additionally contain water, in some cases up to about 50%, so as to support the steam reforming reaction and reduce the exhaust gas recirculation.

Since the methanol never comes into contact with the main fuel of the engine in its liquid state, there are no restrictions on the choice of the main fuel for the combustion engine. It is therefore possible to use different kinds of fuels, e.g., gasoline, diesel oil and other energy rich liquid fuels.

Furthermore, there are no restrictions as regards the design of the combustion engine and its principal function. The invention may thus be applied equally as well with Otto-engines as with diesel engines, Wankel-engines, gas turbines and other combustion engines with internal combustion of the fuel.

The catalytic reactor is a central component in the present system which is used in the application of the invention. This reactor is adequately described in the U.S. Pat. No. 3,918,412. In the present invention, however, only the methanol is added to the catalytic reactor, from a single tank. The main fuel is added directly to the engine from another tank via its own feeding means.

Methanol is particularly advantageous in minimizing problems with soot formation and also starting up as compared to the case when gasoline is used for the steam reforming reaction.

It should be noted here that it may be desirable to additionally incorporate a certain amount of lead in the gasoline to eliminate wear problems which sometimes arise with completely lead-free gasoline. When such lead-containing gasoline is used with the procedure according to the U.S. Pat. No. 3,918,412, the catalyst may be poisoned after a long period of operation. (However, there are some catalysts developed for exhaust gas cleaning with leaded gasoline. These catalysts may also produce certain steam reforming effect when used as catalysts for the procedure according to the present invention.) Suitable catalysts are disclosed, e.g., in U.S. Pat. No. 3,918,412. The catalyst which is described in the U.S. Pat. No. 3,828,736 has also proven to be useful with the procedure according to the present invention. Particularly useful catalysts are noble metal catalysts on carriers and noble metal catalysts on pellets but nickel catalysts may also be used at advantage.

A special advantage with noble metal based catalysts is their better oxidation resistance in the presence of residual oxygen in the gas mixture which is supplied to the catalytic reactor compared to, for instance, nickel based catalysts. The temperature of operation depends on the type of catalyst and the kind of alcohol fuel. It is normally within the range of 200°–600° C., preferably within the range of 250°–400° C. and most preferably within the range of 275°–350° C. with methanol and a noble metal catalyst.

EXAMPLE 1

This invention has been demonstrated in a motor rig at the Royal Institute of Technology in Stockholm. The engine, a four cylinder Volvo B20 A, was placed in a test rig. The power from the motor was dissipated by means of a brake generator delivering the electrical energy to a load resistance. The outgoing exhaust gas was analyzed by means of gas chromatographs and an IR- analytical instrument (URAS-2) for nitrogen oxides. This engine is normally equipped with exhaust gas recirculation. An Engelhard PTX exhaust gas reactor was mounted in the pipe for exhaust gas recirculation and the reactor was insulated. The exhaust gas flow was calibrated by means of a valve. The nozzles in the carburetor had been replaced to give a reduction of the gasoline flow to 95% of the normal flow for this engine when using 100% gasoline. The methanol was fed from a special tank and vaporized in the vaporizer 18, principally shown in the FIGURE, before the introduction into the catalytic reactor 12. The engine was run at an air/fuel ratio of 1.2 whereby the methanol flow was adjusted to amount to 10% of the flow of gasoline on a volume basis.

At 5.8 kW output power, exhaust gas contained 0.2% CO, about 0.02% nitrogen oxide and only traces of unburnt hydrocarbons.

It was not possible to run the engine at this high air/fuel ratio on straight gasoline in the conventional manner without misfire.

EXAMPLE 2

A similar experiment was run at 7.2 kW output power with an air-fuel ratio as high as 1.55. In this experiment the noble metal catalyst was substituted for a commercial nickel catalyst, Girdler G 56, which attained a temperature of operation of 690° C. The methanol feed was 35% of the gasoline feed on a volume basis. The exhaust gas contained 0.16% CO, 25 ppm unburnt hydrocarbons and non-detectable $NO_x$, that is below 10 ppm. The fuel consumption was about 15% less than for a corresponding conventional run with operation on straight gasoline and exhaust gas cleaning. The flow of recirculated exhaust gas was 5.4% of the total exhaust gas stream. Experimental runs with the nickel catalyst reactor were carried out with methanol feeds up to 60% of the volumetric flow of gasoline with the same outstanding results.

These very spectacular results were also obtained when the methanol was substituted for ethanol and isopropanol.

As compared to the procedure according to the U.S. Pat. No. 3,918,412, the present invention provides a simplified start up procedure and also a reduction of harmful emissions during the starting period. The catalyst reached the temperature of operation within 10–20 seconds.

In the Examples described above no special precautions were taken for the starting procedure. One precaution would be, however, to delay supplying the methanol feed to the catalytic reactor until the reactor has reached the temperature of operation. This could be done by means of a temperature indicator controlling a shut-off valve in the methanol pipe. Another precaution would be to start the engine on methanol and then go over to dual-fuel operation when the catalytic reactor has reached the temperature of operation. Components 22, 23 and 24 in the FIGURE are provided for this embodiment of the invention.

The above examples are illustrative only. The teachings of this invention and the present state of the art in the engine technology and catalytic reforming and catalytic reactor fields will readily suggest to one skilled in this art suitable designs and procedures in accordance with this invention for any particular motor type or main fuel to be employed, as well as other variations within the scope of this invention. It should also be recognized from the above that one of the main advantages of the present invention is the large number of possibilities which exist for modification of existing systems to encompass the present invention using available components. This is a highly important, practical advantage of the present invention as compared to more sophisticated solutions to the extremely important and controversial problems discussed above.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a combustion engine employing a fuel comprising gasoline and methanol and having exhaust gas recirculation, the improvement comprising;
   (a) means for mixing a feed stream comprising methanol in a fixed amount selected from within the range of about 5 to 35 percent by volume based on the amount of gasoline supplied to the combustion engine with a water vapor-containing exhaust gas stream in a first zone;
   (b) means within said first zone for catalytically steam reforming said methanol-containing feed stream in the presence of said exhaust gas stream to form a gaseous mixture comprising hydrogen and carbon monoxide, whereby at least a portion of the water vapor and energy required for said steam reforming is provided by said exhaust gas stream;
   (c) means disposed adjacent to said first zone for combining said gaseous mixture of hydrogen and carbon monoxide with a mixture of air and gasoline;
   (d) means operatively connected to said combining means for supplying the hydrogen/carbon monoxide/air/primary gasoline mixture to a combustion zone within said combustion engine;
   (e) means for combusting said mixture in said combustion zone to produce an exhaust gas comprising a reduced amount of noxious components and aldehydes.

2. An improved combustion engine employing a fuel comprising gasoline and methanol, said engine emitting an exhaust gas containing a reduced amount of noxious components and aldehydes, which combustion engine comprises:
   (a) means operatively connected to a first zone for recycling a water vapor-containing exhaust gas stream thereto;
   (b) means for introducing into said first zone a separate feed stream to be mixed with said exhaust gas stream, said separate feed stream including methanol in a fixed amount selected from within the range of about 5 to 35 percent by volume based on the amount of gasoline supplied to the combustion engine;
   (c) means within said first zone for catalytically steam reforming said methanol-containing feed stream in the presence of said exhaust gas stream to form a gaseous mixture comprising hydrogen and carbon monoxide, whereby at least a portion of the water vapor and energy required for said steam reforming is provided by said exhaust gas stream;
   (d) means disposed adjacent to said first zone for combining said gaseous mixture of hydrogen and carbon monoxide with a mixture of air and gasoline;
   (e) means operatively connected to said combining means for supplying the hydrogen/carbon monoxide/air gasoline mixture to a combustion zone within said combustion engine;
   (f) means for combusting said mixture in said combustion zone to produce an exhaust gas comprising a reduced amount of noxious components and aldehydes.

3. The improved combustion engine according to claim 2 wherein said means for combining said gaseous mixture of hydrogen and carbon monoxide with the mixture of air and gasoline is a carburetor and wherein said means for catalytically steam reforming said methanol-containing feed stream is a catalytic reactor maintained at a temperature within the range of 200° to 600° C.

4. The improved combustion engine according to claim 2 wherein said means for combining said gaseous mixture of hydrogen and carbon monoxide with the mixture of air and gasoline is a carburetor and wherein said means for catalytically steam reforming said methanol-containing feed stream is a catalytic reactor containing a noble metal catalyst, which reactor is maintained at a temperature within the range of 275° to 350° C.

5. The combustion engine according to claim 2, further comprising means for vaporizing the methanol prior to mixing the methanol with the exhaust gas stream.

6. The combustion engine according to claim 5 wherein the means for vaporizing the methanol comprises a vaporization zone having heat from the exhaust gas stream.

* * * * *